Jan. 22, 1935.  G. GORTON  1,989,007
MACHINE TOOL
Filed Feb. 6, 1934   5 Sheets-Sheet 2

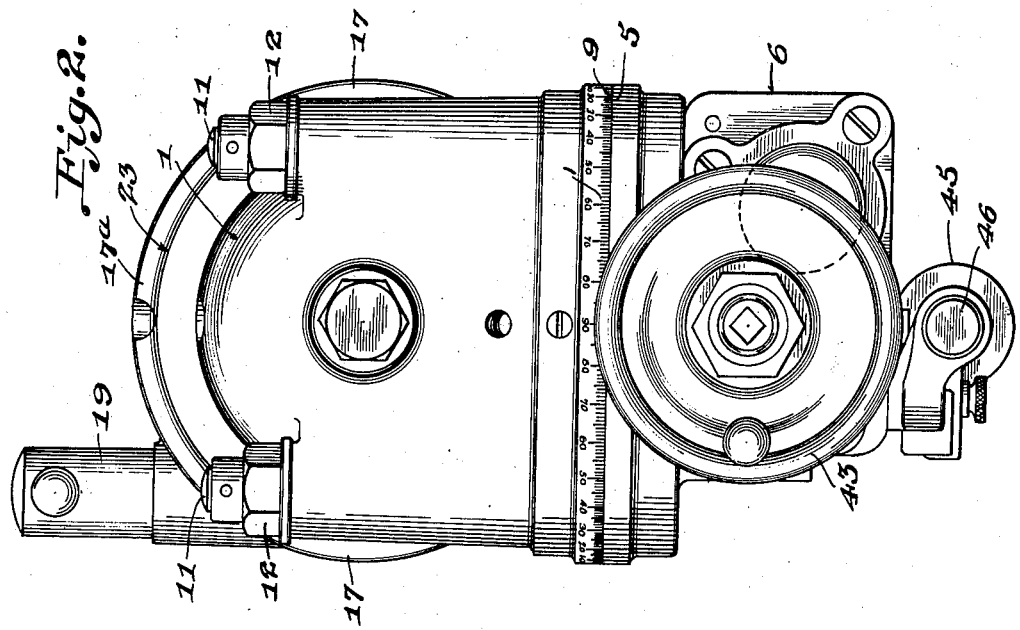

Inventor
George Gorton
By Hubert E. Peck  Attorney

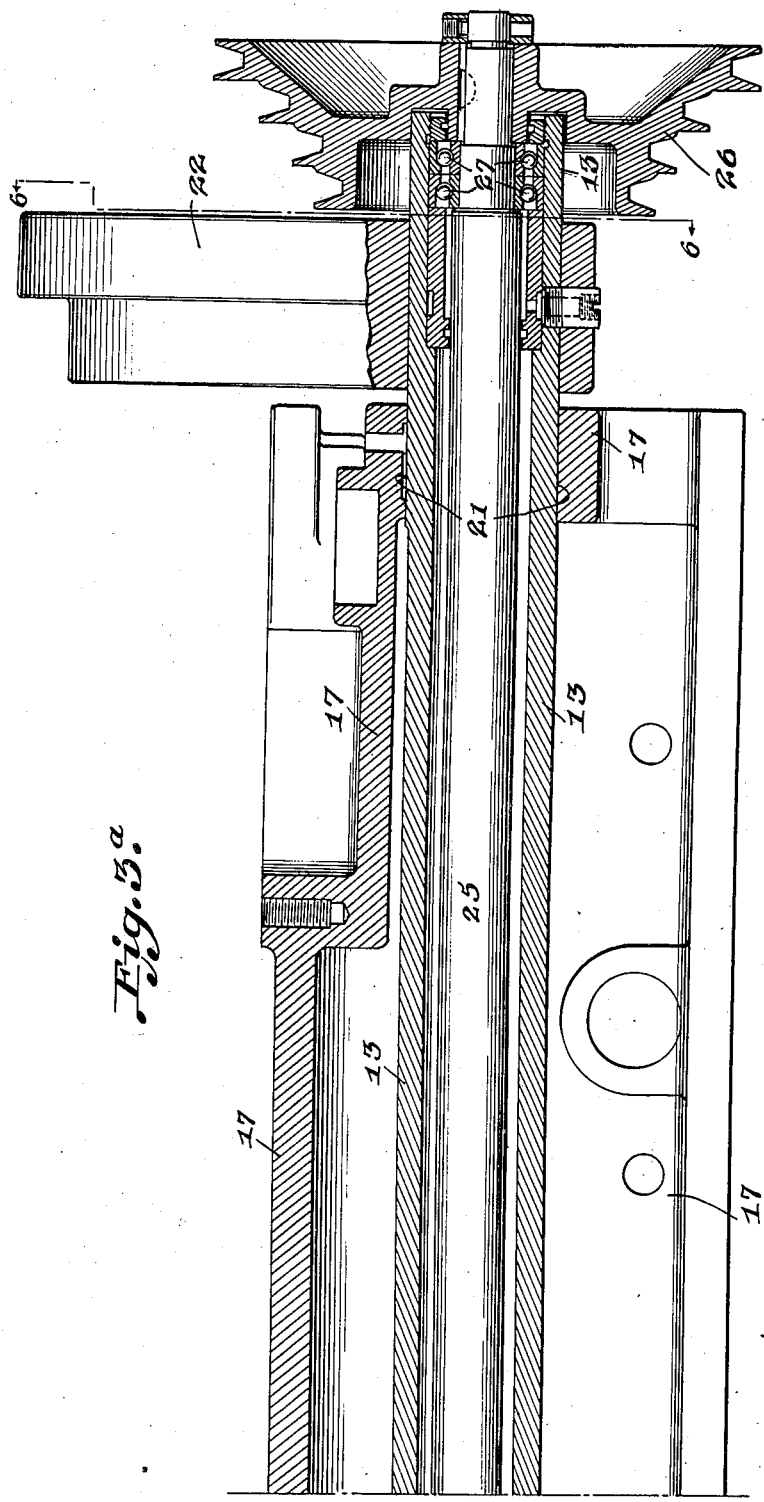

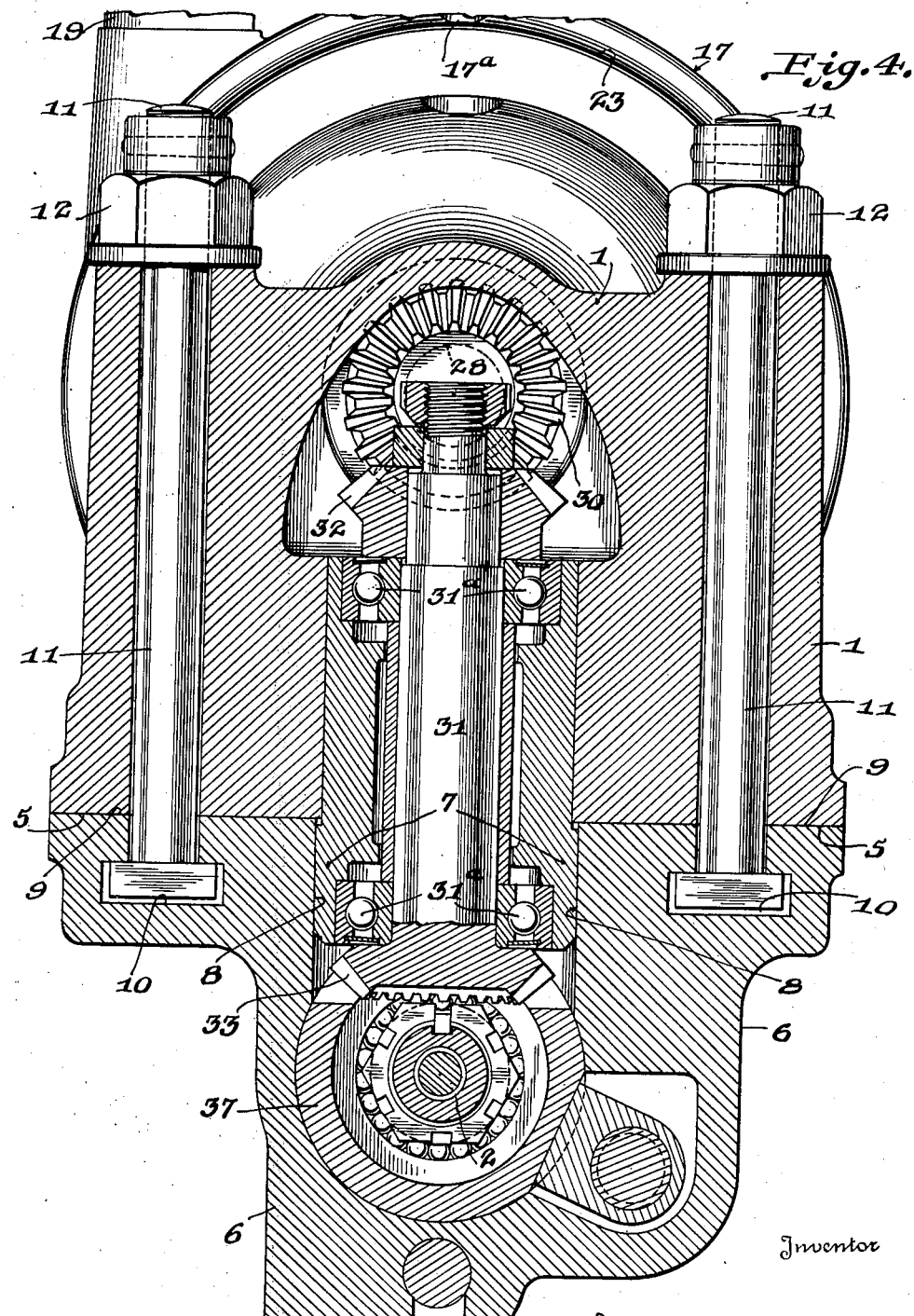

Jan. 22, 1935.  G. GORTON  1,989,007
MACHINE TOOL
Filed Feb. 6, 1934  5 Sheets-Sheet 5
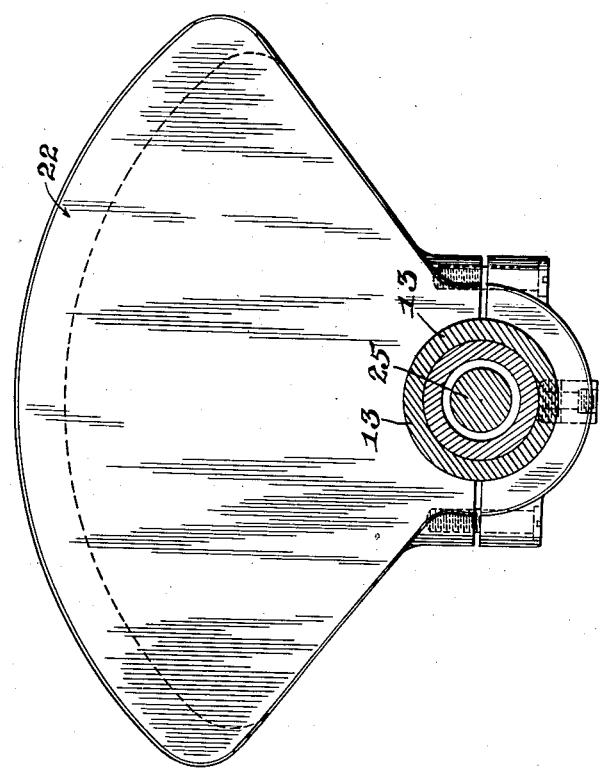
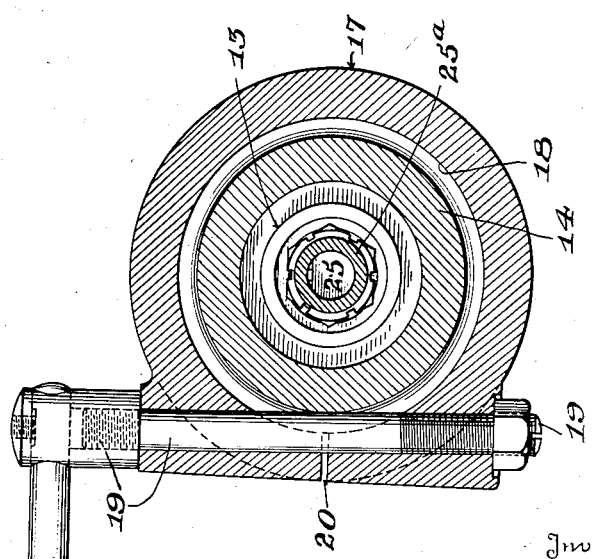
Inventor
George Gorton
By Hubert E. Ricks Attorney Patented Jan. 22, 1935

1,989,007

UNITED STATES PATENT OFFICE 1,989,007

MACHINE TOOL

George Gorton, Racine, Wis.

Application February 6, 1934, Serial No. 710,008

14 Claims. (Cl. 90—17)

This invention relates to the machine tool art, and specifically involves improvements in machines of the so-called swivel head type wherein the swivel head carries a cutter spindle, and is adjustable around a center or axis to operatively hold the cutter at any one of various angular positions; and the objects and nature of the invention will be understood by those skilled in the art in the light of the following explanations of the accompanying drawings illustrating the preferred mechanical expression or embodiment of the invention from among other constructions and arrangements within the spirit and scope thereof.

An object of the invention is to so improve milling, routing, and/or other machines of the adjustable swiveled head type, as to render them more accurate and efficient in operation, easier to adjust with accuracy and precision, and to facilitate adjustments and enable the same to be more quickly accomplished, and with greater safety to the operator.

A further object of the invention is to provide certain improvements looking toward the production of a highly advantageous machine of the adjustable swiveled head type, overcoming certain difficulties present in the machines of this type heretofore known. With the foregoing and other objects in view that will be developed as the following description proceeds, the invention consists in certain novel structural features and arrangements, and in certain combinations of cooperating elements, as hereinafter more fully explained and specified.

Referring to the accompanying drawings, forming a part hereof:—

Fig. 1 is a detail front perspective of a universal head machine tool embodying the invention, the machine being partially broken away.

Fig. 2 is a front elevation of the swivel head and its supporting mounting, and the cutter head which is shown adjusted on the depending end of the swivel head to a rearwardly extending horizontal position.

Figs. 3 and 3a, show the swivel head and its mounting and supporting housing and the cutter head in the relative positions or adjustments in which these parts appear in Fig. 2, the parts being shown in longitudinal vertical section, the cutter head appearing in part in side elevation.

Fig. 4 is an enlarged cross section taken in the plane of the line 4—4, Fig. 3.

Fig. 5 is a cross section on the line 5—5, Fig. 3.

Fig. 6 is a cross section on the line 6—6, Fig. 3a.

Figure 3:
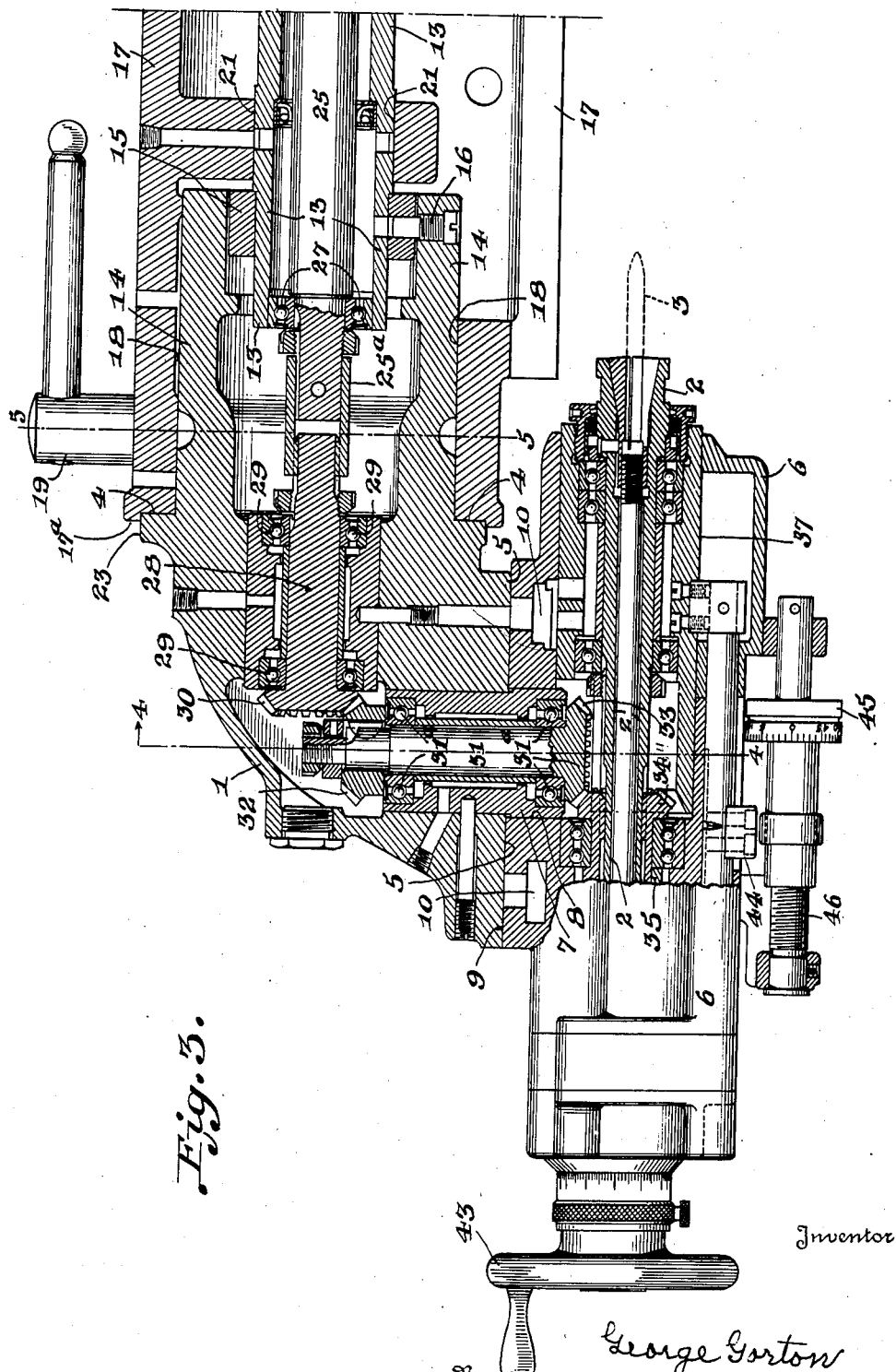

In the drawings, I have disclosed an embodiment of my invention included in a milling, routing, or allied machine of the swivel head rotary cutter spindle type without thereby intending to limit my invention to milling and/or routing machines, as it is my desire to cover my invention for all machine uses to which it can be adapted or in which it can be employed.

The machine partially disclosed, provides a so-called swiveled head 1, that operatively overhangs, or is arranged above any suitable work table or other work holder. This head 1, carries a cutter spindle 2, operatively carrying a removable replaceable rotary cutter 3, adapted to be operatively driven by the spindle. Broadly, the operating cutter can be applied to or carried by the swivel head, by any suitable means or in any suitable manner, and can be driven by any suitable means, where a rotary cutter is employed. The swivel head is designed to hold the cutter in operative relation to the work held by the work holder or table, and the swivel head is adjustable around its supporting axis to hold the cutter at any desired angular position within the adjusting range of said head. In the example shown, the swivel head 1, forms an approximate right angle elbow or bend, projecting laterally from the axis on which the head is rotatively adjustable.

In the particular embodiment illustrated as an example for purposes of explanation, the swivel head at its rear portion, forms an annular face or seat 4, concentric with the axis on which the head is rotatively adjustable, and this seat 4, is located in a plane perpendicularly intersected by said axis, while the outer, free or eccentric arm of said head provides an end seat or face 5, located in a plane spaced a substantial distance, radially from said axis, and concentric with a line perpendicular to said face 5, and intersecting and perpendicular to said axis. In this particular example, the plane of end face 5, is at right angles to the plane of face 4, although I do not wish to so limit the broad features of my invention. Also, in the particular example illustrated without intending to so limit all features of the invention, a longitudinally elongated cutter head or carrier 6, is carried by the swivel head 1, and mounted on or to the outer end thereof and eccentrically loads the same and the axis on which said swivel head with its load is rotatively adjustable. The strong, heavy, massive swivel head itself, presents a substantial eccentric load on its said axis by reason of the lateral end projection of said head, and to this eccentricity must be added the heavy eccentric weight of the cutter head and parts carried thereby, in this example.

The cutter head 6, in this example, is swiveled to the outer end or laterally projection portion of swivel head 1, for relative rotative adjustment on a transverse axis located more or less approximately midway the cutter head length, and radially of the axis on which the swivel head 1, is rotatively adjustable as well as perpendicular to the longitudinal axis of the cutter head, i. e. radially of the axis of the cutter spindle carried by head 6.

Various means and arrangements can be provided for thus adjustably mounting a cutter head or cutter spindle carrier on the swivel head, as for example, I show, the swivel head provided with a rigid tubular stud or journal 7, projecting from the center of its outer end face 5. The cutter head 6, is formed with a rigid exterior side or lateral hub providing a bearing bore 8, for and receiving the journal stud 7, and a flat face 9, surrounding and concentric with bore 8, in which stud 7, has bearing, and this flat annular face 9, is complementary to and fits the end face 5, of the swivel head.

The cutter head is rotatively adjustable with respect to the swivel head, on and around the journal stud 7, as a center, to any desired angular position, say within a full circle or 360°, if so desired. Any suitable means can be provided for rigidly locking the cutter head to the swivel head, in the desired adjusted position. For instance, I show said lateral hub of the cutter head formed with an annular T slot 10, concentric with bore 8, and supporting stud 7, and opening through the face 9, of said hub, and more or less loosely receiving the headed ends of clamping bolts 11, extending loosely through appropriate bolt holes in the swivel head 1, and at the exterior thereof having clamping nuts 12, by which said bolts can be tightened to rigidly lock the cutter head to the swivel head against relative movement, whereby when said nuts are rotated to loosen the bolts, the cutter head can be rotated on stud 7, to adjust the cutter, in this example, through 360°, during which adjustment the T-slot permits the hub of the cutter head to slide freely on the heads and shanks of said bolts which are held in their relative positions in their respective bolt holes in the swivel head.

The swivel head is rotatively supported and mounted for rotative adjustment, in the particular example illustrated, on a horizontal axis extending rearwardly of the machine supporting frame, from said front head located over the work table, and this axis is located eccentrically to the heavy load consisting of the swivel head and the cutter head mounted thereon, and the swivel head supporting mounting is also during the operation of the cutter on the work, subjected to heavy thrusts and stresses that are eccentric with respect to and transversely of said axis and tend to set up objectionable vibration.

As one example of a swivel head mounting among others within my invention, I show the swivel head 1, provided with a longitudinally elongated straight horizontal strong rigid rotary shaft 13, extending rearwardly from the head and operatively fixed thereto as normally rigid therewith, and alined with or establishing the axis on which said head is adjustable rotatively.

The swivel head 1, is formed rigid or in one piece with, a strong heavy rearwardly extending exteriorly cylindrical supporting shank 14, of enlarged diameter with respect to but concentric and alined with said shaft or axis 13.

This cylindrical shank 14, is preferably hollow and open at its rear end, and the axis or shaft 13, at its front end extends forwardly concentrically into said shank and fits snugly therein and is normally operatively rigidly secured thereto, as by sleeve 15, and bolt 16, or in any other suitable manner.

The supporting frame of the machine provides any suitable supporting housing or bearing means for the shank 14, and the axial shaft 13, such as horizontally elongated swivel head carrying and supporting tubular or hollow housing 17, preferably extending horizontally from the rear to the front of the machine and, at least normally, rigidly supported by and from the machine supporting frame if not constituting a constantly rigid part thereof. The front end of this supporting housing 17, provides an open-front-end longitudinally-elongated, internally cylindrical bearing 18, in which the cylindrical shank 14, of the swivel head is mounted for rotative adjustment when released for that purpose, although said shank is normally rigidly held by and in said bearing against relative movement. The swivel head shank and the housing that provides the bearing 18, receiving said shank, can be normally held rigidly locked together by clamping bolt 19, where the bearing forms a contractile clamp by reason of a longitudinal split 20, in the housing, and whereby the split clamp can be allowed to expand to release the shank 14, for rotation, by rotation of bolt 19 to loosen the clamp.

The axial shaft 13, rigid with the swivel head extends longitudinally through the supporting housing and projects beyond the rear end thereof, and the housing internally provides alined front and rear supporting bearings 21, for and in which shaft 13, is rotatable.

At its rear end portion beyond the rear of the supporting housing 17, said axial shaft 13, of the swivel head, is provided with a radially projecting or eccentric counter balancing weight 22, normally fixedly secured thereto to rotate therewith.

The radius of the eccentric gravity load of the weight 22, on the swivel head shaft 13, is diametrically opposite the radius of the eccentric load of the swivel head etc. on said shaft 13, and these two opposing gravity loads tending to rotate said shaft in opposite directions, aproximately counterbalance each other.

The weight and form of counterbalance 22, and its fixed radius of projection from shaft 13, are such as to approximately prevent shaft rotation under the action of the eccentric load imposed on the shaft by the swivel and cutter heads, preferably in such manner, that when the swivel head and its axial shaft 13, are released for rotative adjustment, the swivel head can be rotated on axis 13, almost if not quite by a touch of the hand, and said swivel head will remain in the position to which swung, without requiring the hands to hold the same, while the clamping bolt 19, is being operated to lock the swivel head in such adjusted position.

In the arrangement shown, the swivel head can be adjusted around the axis 13, to any desired angular position within 360°, and can be set and secured with great accuracy and ease at the exact angular position required, as determined, for instance, by graduations around the circumference of the rim 23 of the swivel head shank, in cooperation with an index on the annular vertical front end surface 17a of the housing 17.

The provision of the swivel head counterbalancing shaft arrangement, avoids the necessity of lifting the eccentric weight of the swivel head, and holding the same by hand, during adjustment, and locking, which leads to inaccuracy and laborious time-consuming work, particularly in heavy work machines, and reduces to the minimum possibility of injury to operatives in making adjustments.

The supporting housing with the swivel head shaft 13 therein, provides an exceedingly advantageous and compact organization for carrying the power transmission from the rear of the machine to the rotary cutter spindle and its cutter, carried by the swivel head at the front of the machine. To this end the shaft 13 is longitudinally tubular, forming a strong rigid tube, and the rotary cutter drive shaft 25, is mounted concentrically within said tube 13, and extends therethrough and preferably projects therefrom at its front and rear ends.

Any suitable, preferably power-actuated, driving means is applied to the rear end of said rotary shaft 25, although I happen to show a belt drive pulley 26 normally fixed on the projecting end of said rotary shaft for driving the same.

I also show suitable radial and end thrust bearings 27 for said rotary shaft fixed within the tubular shaft 13, to maintain the axial alinement of the rotary shaft within the tubular shaft.

This rotary shaft 25 is extended forwardly into the swivel head through the shank of said head, preferably by a longitudinally alined, rotary extension 28 mounted to rotate in suitable, preferably, radial and end thrust bearings 29, within said head; and at its front end, within said head, said extension has bevel gear pinion 30, rigid therewith, driving rotary radial shaft 31, through the medium of its bevel gear pinion 32.

The outer end of radial shaft 31, carries bevel gear pinion 33, within the cutter head 6, to drive the cutter spindle 2, through the medium of bevel gear pinion 34, rigid with rotary spindle driving sleeve 35, surrounding and concentric with said spindle 2, and splined thereto to permit relative longitudinal cutter feeding and withdrawal movements of the spindle within the rotary driving sleeve while maintaining the spindle rotating connection from sleeve to spindle.

I prefer, in this example, to provide a detachable driving shaft coupling 25a, within the cylindrical supporting shank 14 of the swivel head, from the front end of rotary shaft 23, to the rear end of the shaft extension formed by the short shaft 28, mounted in the swivel head and under constant driven relation with shaft 25, through said shaft coupling 25a, and axially alined therewith.

Where the cutter spindle carrier secured to the swivel head organization of this invention is adjustable with respect to the swivel head, and, say, of the general type of the cutter head 6, I gain advantage by locating the cross or radial shaft 31 in longitudinal alinement with the axis on which cutter head 6 is rotatively adjustable in the swivel head.

For this purpose, I extend the radial shaft 31, centrally and longitudinally through and mount the same to rotate in the stud or trunnion 7 on which the cutter head is rotatively adjustable. I prefer to form the stud 7, as a strong, longitudinally-elongated, tubular member fixed in a bore in the swivel head extending radially from the chamber within said head containing gears 30, 32, to and centrally through the base 5 of said head against which the base 9, of the cutter head seats. The radial shaft extends centrally through said tubular member and beyond the ends thereof and can be rotatively mounted therein on radial and end thrust roller bearings 31a, if so desired, whereby the cutter spindle 2, of the cutter head can be driven from shaft 25, when the cutter head is relatively adjusted on the swivel head to any angular position within 360°, as permitted by the turn-table provided by the trunnion 7, and swivel head base 5, and the cutter head complementary bearing bore 8, and base 9, and the annular T-slot slidably receiving the clamping bolts 11, carried by the swivel head.

In this example, the cutter head 6, although more or less heavy and massive, can be conveniently rotatively swung on trunnion 7, and held by hand during adjustment and accurate positioning and locking, because said trunnion is located more or less approximately midway the length of cutter head 6, with the cutter head more or less approximately balanced on said trunnion 7.

In the particular example illustrated, I prefer to mount the rotary cutter spindle 2 in a nonrotary spindle-carrying slide, such as barrel or sleeve 37, confined in the cutter head housing to longitudinal sliding movement to feed the rotary cutter to its limited working depth and to withdraw the same from the work. The cutter spindle is arranged centrally and longitudinally of and within the barrel to freely rotate therein while held against objectionable relative longitudinal movement. Any suitable means can be provided for feeding the barrel to and from the work and for holding the same during the cutter work, and also any suitable adjustable means can be provided for limiting or setting the working depth of the cutter.

For instance, among various cutter feeds, I can provide any suitable power transmission within the housing of cutter head 6, operatively joining the rotary exterior feed wheel or handle 43, with the sliding barrel or sleeve 37, carrying the rotary cutter spindle 2, whereby the sleeve 37, and the cutter can be moved longitudinally of the cutter head housing toward and from the work, said transmission preferably including screw thread connections or other means to hold the cutter spindle in the position to which fed. However, I do not wish to limit my invention to any particular feed means, nor, in fact, to feed means, nor to any particular depth stop mechanism, nor, in fact, to the provision of a depth stop.

I happen to show a depth stop for the rotary cutter spindle, in accordance with the depth stop means disclosed and claimed by my Patent No. 1,889,653, Nov. 29, 1932. In this connection, I show stop 44, normally fixed to and movable longitudinally with the cutter spindle barrel 37, and vertically adjustable stop 45 carried by and arranged at the exterior of the cutter head housing and located below and in the downward path of movement of the barrel stop 44, to limit the downward movement of the barrel. The stop 45 is adjustable vertically by rotation through screw threaded connection with threaded shaft 46, although I do not wish to so limit my present invention.

If so desired, graduations can be provided around the circumference of either the cutter head base 9 or the swivel head base 5, with a cooperating index on the circumference of the base not provided with the scale.

The disclosure hereof is subject to various changes, modifications, departures, omissions, and/or additions, within the spirit and scope of my invention, and hence the disclosure is for explanatory and illustrative purposes, and not for purposes of limitation.

What I claim is:—

1. A machine tool including a supporting frame; a swivel head carried by said frame and rotatively adjustable on an axis arranged off center with respect to said head; a cutter carried by said head and adapted to be adjusted thereby to various angular positions on said rotative movement of said head; means for rigidly locking said head in adjusted position and whereby said head can be released for adjustment on said axis; and counterweight means acting on said head to counterbalance the eccentric load thereof on said axis and to cause said head, when released for rotative adjustment, to remain in any adjusted position to which rotated on said axis, while being secured by said means for rigidly locking said head, said counterweight means including a weight remote from and arranged to the rear of said head and means normally operatively coupling said weight to said head.

2. A machine tool having a supporting housing; a swivel head carrying a cutter spindle, said head carried by said housing and rotatively adjustable on an axis eccentrically arranged with respect to said head; means whereby said head is normally fixedly secured with respect to said housing and whereby said head can be released for relative rotary adjustment; a rotary shaft alined with said axis and operatively fixed to said head; and counterweight means acting on said shaft in opposition to the eccentric load of said head on the shaft, to approximately counterbalance said head and the shaft.

3. In combination, a supporting housing; a swivel head carrying a cutter spindle in advance of said housing, said head being carried by and mounted with respect to said housing for relative rotative adjustment to carry said spindle to various angular positions; means for holding the head in the position to which adjusted; a shaft operatively fixed to said head to rotate therewith on its said rotative adjustments, said shaft mounted in said housing; and counterweight means normally fixed on said shaft in eccentric relation to approximately counterbalance the eccentric weight of said head on said shaft.

4. In combination; a supporting housing providing a front longitudinal bearing, and provided with shaft bearings; a swivel head carrying a cutter spindle, and provided with a rearwardly extending cylindrical shank mounted in said front bearing for rotative adjustment of said swivel head on a longitudinal axis eccentric with respect to said head and its load; a shaft rotating with said shank and mounted in said shaft bearings; a weight eccentrically acting on said shaft in opposition to the eccentric load of said swivel head on said shaft; and means for normally holding said head in operative position.

5. In combination; a support; a swivel head provided with a cutter spindle in front of said support, said head projected into and mounted in said support for relative rotative adjustment on an axis eccentric with respect to the head; said head provided with a rearwardly extending shaft alined with said axis and rotatable with said head; a counterweight normally rigid with and extending radially from the rear of said shaft beyond said support to approximately counterbalance the eccentric load of said head on the shaft; and means for normally holding said head in operative position against rotation on said axis.

6. In combination; a supporting housing providing a hollow internally cylindrical front swivel head supporting bearing; a swivel head provided with and supporting a rotary cutter spindle and its carrier, said head provided with a supporting rearwardly projecting rigid elongated shank longitudinally arranged and mounted to rotate in said bearing on a longitudinal axis with respect to which said head is eccentrically arranged; means for normally contracting said bearing on said shank rigidly holding said shank and the head in operative position with respect to said housing; and power transmission means for driving said cutter spindle, extending through said shank and head and into said carrier to said spindle for actuating the same.

7. In combination; a support; a swivel head provided with a rotary cutter spindle and its carrier; said head being rotatively carried by said support for adjustment on an off-center axis; a rearwardly extending tubular shaft, rigid and rotatable with said head and alined with said axis; counterbalancing means acting on said shaft in opposition to the eccentric load of said head on the shaft; and a power transmitting rotary shaft longitudinally alined with and rotatable in and extending through said tubular shaft and into said head, and operatively coupled to said spindle to drive the same.

8. In combination; a supporting housing having a longitudinal, internally cylindrical, bearing providing a split contractile clamp and its contracting means; a swivel head provided with a cutter spindle, said head formed with a rearwardly extending cylindrical supporting shank rigid therewith and longitudinally arranged and rotatable in said bearing to rotatively adjust said head to any angular position within its range of angular adjustment around a longitudinal axis with which said head is eccentrically arranged, said bearing being normally contracted on said shank to rigidly hold said head in fixed operative position; and counterbalancing means acting on said head in opposition to the eccentric load of said head on said axis, including supporting means operatively connected to said shank.

9. In combination; supporting means; a swivel head carried thereby for rotative adjustment on a longitudinal axis arranged off-center with respect to said head, the outer end of said head extending laterally with respect to said axis; a cutter head mounted on said outer end of the swivel head for rotative adjustment on the swivel head on an axis transversely arranged with respect to the axis on which the swivel head is rotatively adjustable; said cutter head provided with means for carrying and actuating a rotary cutter arranged beyond one end thereof; power transmission means extending into said swivel head along said axis on which said swivel head is adjustable, and therefrom into said cutter head along the axis on which said cutter head is adjustable on the swivel head, to drive said means for actuating said rotary cutter; and counterbalancing means acting eccentrically on said swivel head with respect to its said longitudinal axis to approximately counterbalance the eccentric weight of said head and its load with respect to said off-center axis, said counterbalance means including a counterweight located to the rear of and remote from said swivel head, and means supporting said weight in normal operative eccentric relation to said swivel head.

10. In combination; a supporting housing; a swivel head provided with and carrying rotary cutting means, said head mounted in said housing for rotative adjustment on a longitudinal axis, and normally held in fixed operative position with respect to said housing, said head having a rearwardly extending longitudinally tubular shaft normally fixed thereto to rotate therewith, in longitudinal alinement with said axis and having bearing in said housing and extending therethrough; a rotary power shaft mounted in and extending through said tubular shaft and adapted to have driving means applied to its rear end, and cutter driving means actuated by said power shaft and carried by said head.

11. In combination; a support; an eccentric swivel head provided with and carrying a rotary cutter, said head supported and mounted on said support for rotative adjustment on a longitudinal horizontal axis off-center with respect to said head, said head being normally held in fixed operative relation with respect to said support; and means constantly rotatively acting on said head to counterbalance the rotative action of the eccentric weight of said head, said means including a laterally-projecting counterweight located in the rear of said head and its support, and supporting means operatively coupling said weight to said head to swing on an axis alined with said off-center axis.

12. In combination, in a swivel-head tool, a forwardly extending supporting structure at its front end providing a horizontally elongated tubular bearing; a swivel head provided with a cutter, said head formed with a rearwardly projecting elongated cylindrical supporting shank rigid therewith, and complementary to and fitting within said head supporting bearing for rotation therein to angularly adjust the swivel head with respect to the longitudinal axis of said bearing; and means for normally maintaining the shank and tubular bearing rigidly secured together in swivel head supporting and locking relation, and whereby said shank can be released for rotating in said bearing for said head adjustment.

13. In a swivel-head tool, in combination; a horizontally elongated head supporting structure at its front end providing a longitudinal tubular bearing and to the rear thereof providing relatively reduced diameter shaft bearing alined with the longitudinal axis of said front tubular bearing; a swivel head for an operating cutter; said head arranged in front of said tubular bearing and provided with a cylindrical rearwardly projecting supporting shank rigid with the head and complementary to and arranged longitudinally within said tubular bearing for rotative adjustment on the common longitudinal axis of the shank and tubular bearing; a shaft arranged longitudinally of said housing alined with said longitudinal axis and mounted in said shaft bearings and rigid with said shank and head to rotate therewith; and means for normally maintaining said shank and tubular bearing in swivel head-locking and supporting relation, and whereby said shank can be released for rotation in its said bearing for swivel head angular adjustment.

14. In a swivel-head tool, in combination; a supporting structure at one end providing a horizontally-elongated swivel head supporting bearing; and a swivel head for a cutting tool, said head arranged in front of said bearing and provided with a rearwardly elongated cylindrical supporting shank rigid with the head and arranged and journaled in said tubular bearing for angular adjustment of the head by rotation of the shank in said bearing, said tubular bearing forming a split contractile clamp provided with contracting means for normally rigidly holding the shank and bearing locked together in head holding and supporting relation.

GEORGE GORTON.